(12) United States Patent
Rokunohe et al.

(10) Patent No.: US 7,193,172 B2
(45) Date of Patent: Mar. 20, 2007

(54) GAS-INSULATED SWITCHGEAR TANK

(75) Inventors: Toshiaki Rokunohe, Hitachinaka (JP); Yoshitaka Yagihashi, Hitachi (JP); Fumihiro Endo, Hitachi (JP); Tomoaki Utsumi, Hitachi (JP); Shunji Ito, Hitachi (JP); Takashi Omori, Hitachi (JP)

(73) Assignees: Hitachi, Ltd., Tokyo (JP); Japan AE Power Systems Corporation, Tokyo (JP)

( * ) Notice: Subject to any disclaimer, the term of this patent is extended or adjusted under 35 U.S.C. 154(b) by 0 days.

(21) Appl. No.: 10/921,861

(22) Filed: Aug. 20, 2004

(65) Prior Publication Data

US 2005/0056617 A1  Mar. 17, 2005

(30) Foreign Application Priority Data

Sep. 17, 2003  (JP) .............................. 2003-324047

(51) Int. Cl.
*H01H 33/00* (2006.01)
(52) U.S. Cl. ......................................... 218/43; 218/68
(58) Field of Classification Search ............. 218/6–70, 218/78–80, 84, 119, 120, 122, 155; 361/601–603
See application file for complete search history.

(56) References Cited

U.S. PATENT DOCUMENTS 4,967,307 A * 10/1990 Itou et al. .................... 361/618
5,191,180 A * 3/1993 Kitamura et al. ............ 218/135
6,751,078 B1 * 6/2004 Munakata et al. ............. 361/58
6,865,072 B2 * 3/2005 Sato et al. ................... 218/155
2002/0060204 A1 * 5/2002 Tohya et al. ................. 218/155

FOREIGN PATENT DOCUMENTS

| JP | 57185628 | 11/1982 |
| JP | 60141105 | 7/1985 |
| JP | 60205926 | 10/1985 |
| JP | 11-018223 | 1/1999 |
| JP | 2001-251714 | 9/2001 |
| JP | 2002-199522 | 7/2002 |

OTHER PUBLICATIONS

"24kV-datsu-SF$_6$-gata-gas-zetiemm swotcjgear"—Fujijihou vol. 75, No. 11 2002.

* cited by examiner

*Primary Examiner*—Elvin Enad
*Assistant Examiner*—M. Fishman
(74) *Attorney, Agent, or Firm*—Crowell & Moring LLP (57) ABSTRACT

In a gas-insulated switchgear tank in which an electric insulating characteristic is improved by a gas, and which has a vacuum circuit-breaker, a disconnecting switch, and a container in which container the vacuum circuit-breaker and the disconnecting switch are arranged and an inside of which container is adapted to be hermetically sealed and filled with the gas in such a manner that the vacuum circuit-breaker and the disconnecting switch are at least partially surrounded by the gas, the gas includes $N_2$ and $O_2$.

15 Claims, 6 Drawing Sheets

GAS-INSULATED SWITCHGEAR TANK

BACKGROUND OF THE INVENTION

The present invention relates to a gas-insulated switchgear tank.

JP-A-2002-199522 discloses a switch gear in which a vacuum circuit-breaker and silicone oil are used. Fujijihou Vol. 75, No. a switchgear product in which a vacuum circuit-breaker and dry-are are used.

BRIEF SUMMARY OF THE INVENTION

An object of the present invention is to provide a gas-insulated switchgear tank suitable for environment-consciousness while maintaining an electrical insulating characteristic.

According to the invention, in a gas-insulated switchgear tank in which an electric insulating characteristic is improved by a gas, and which has a vacuum circuit-breaker, a disconnecting switch, and a container in which container the vacuum circuit-breaker and the disconnecting switch are arranged and an inside of which container is adapted to be hermetically sealed and filled with the gas in such a manner that the vacuum circuit-breaker and the disconnecting switch are at least partially surrounded by the gas, since the gas includes $N_2$ and $O_2$, the electric insulating characteristic by the $N_2$ is further improved by $O_2$.

It is preferable for maintaining a hermetic sealing of the vacuum circuit-breaker securely, particularly, improving an operable life time of a bellows of the vacuum circuit-breaker against a fatigue caused by repeated expansion and contraction of the bellows that the container includes a first compartment in which at least a part of the vacuum circuit-breaker is exposed to the gas, and a second compartment in which at least a part of the disconnecting switch is exposed to the gas, and a gaseous pressure in the first compartment is lower than a gaseous pressure in the second compartment.

It is preferable for keeping the electric insulating characteristic of the gas that the gas not include a vapor whose dew point is not less than a minimum value of an environment temperature in which environment temperature the gas-insulated switchgear tank is permitted to be used, and/or that the gas does not include a vapor whose dew point is not less than a minimum value of a temperature in the container in which temperature at least one (or both) of the vacuum circuit-breaker and the disconnecting switch is permitted to be operated.

It is preferable for easily or securely finding a leakage of the gas that the gas further includes a smelly gas component.

It is preferable for effectively improving the electric insulating characteristic of the $N_2$ by $O_2$ that a partial pressure of $O_2$ is 5–60% of a total pressure of the gas.

It is preferable for maintaining the hermetic sealing of the vacuum circuit-breaker securely, particularly, improving the operable life time of the bellows of the vacuum circuit-breaker against the fatigue caused by repeated expansion and contraction of the bellows that a direction in which a movable contact of at least one of the vacuum circuit-breaker and the disconnecting switch is movable is vertical.

It is preferable for effectively improving the electric insulating characteristic of the gas that a pressure of the gas in the container is 0.2–0.8 MPa·abs. It is preferable for effectively utilizing the electric insulating characteristic of $N_2$ that the gas includes $N_2$ and $O_2$ as main components thereof. It is preferable for miniaturization of the gas-insulated switchgear tank that a maximum length of (the longest length measurable in) a part of the gas-insulated switchgear tank, which part does not include a driving mechanical force generator for generating a driving mechanical force absorbed in the gas-insulated switchgear tank, extends in a direction which a maximum length of (the longest length measurable in) the vacuum circuit-breaker extends, and/or that the maximum length of the part of the gas-insulated switchgear tank, which part is prevented from including the driving mechanical force generator for generating the driving mechanical force absorbed in the gas-insulated switchgear tank, extends along a direction in which a movable contact of at least one (or both) of the vacuum circuit-breaker and the disconnecting switch is movable. It is preferable for maintaining the hermetic sealing of the vacuum circuit-breaker securely, particularly, improving the operable life time of the bellows of the vacuum circuit-breaker against the fatigue caused by repeated expansion and contraction of the bellows that the direction is vertical. It is preferable that the container has one of cylindrical shape and box shape.

When the vacuum circuit-breaker has a bellows shape deformable to expand and contract so that a vacuumed chamber is formed in the bellows shape and a movable contact movable in the vacuumed chamber, it is preferable for improving the operable life time of the bellows against the fatigue caused by repeated expansion and contraction of the bellows that an outer periphery of the bellows shape is exposed to the gas in the first compartment, and/or that both ends of the bellows shape terminating respectively in an expansion and contraction direction of the bellows shape overlap each other at least partially as seen vertically. It is preferable for effectively improving the electric insulating characteristic of the $N_2$ by $O_2$ while keeping the operable life time of the bellows against the fatigue caused by repeated expansion and contraction of the bellows that a ratio of a partial pressure of $O_2$ in the gas to a total pressure of the gas is greater than a ratio of a partial pressure of $O_2$ in the atmosphere to a total pressure of the atmosphere.

Other objects, features and advantages of the invention will become apparent from the following description of the embodiments of the invention taken in conjunction with the accompanying drawings.

DETAILED DESCRIPTION OF THE INVENTION

At first, a principle as a basis of the invention is explained. $N_2$ is known as a gas of extremely low influence on environment load. Further, $N_2$ is not electrically negative gas and is known as a good insulating gas of typical electron retarding gas. The electron retarding gas decelerates high-speed electrons to decrease electron energy. But, dielectric strength of $N_2$ is about one third in comparison with $SF_6$ as a generally used electrically negative gas, and thereby an improvement of dielectric strength thereof is necessary.

Further, when the dielectric strength of $N_2$ is 1, it is generally known that of $N_2O$ is 1.1, that of $CH_4$ is 1.0, that of $CO_2$ is 0.9, and that of $O_2$ is 1.0, irrespective of change thereof in accordance with various conditions. Among these, $N_2$ satisfies all of less influence on environment load, high dielectric strength, and easiness on handling.

A mechanism on destroying the insulation of $N_2$ is as follows. When an acceleration more than electron retarding effect is applied to the electrons by an electric field, electron avalanche occurs to increase a number of the electrons so that the insulation is destroyed. Generally, it is known that the dielectric strength is improved to increase a break down voltage by mixing the negative gas with the electron retarding gas, but the negative gas increasing significantly the dielectric strength is designated as a global warming gas, or GWP thereof is more than 1, so that the influence on the global environment is concerned.

On the other hand, as the negative gas whose global warming coefficient is not more than 1 and which does not include atom of Chlorine, Fluorine, Sulfur or the like, $CO_2$ and $O_2$ exist. Particularly, $O_2$ is not the global warming gas, and can improve the dielectric strength when being mixed with $N_2$.

Figure 1:
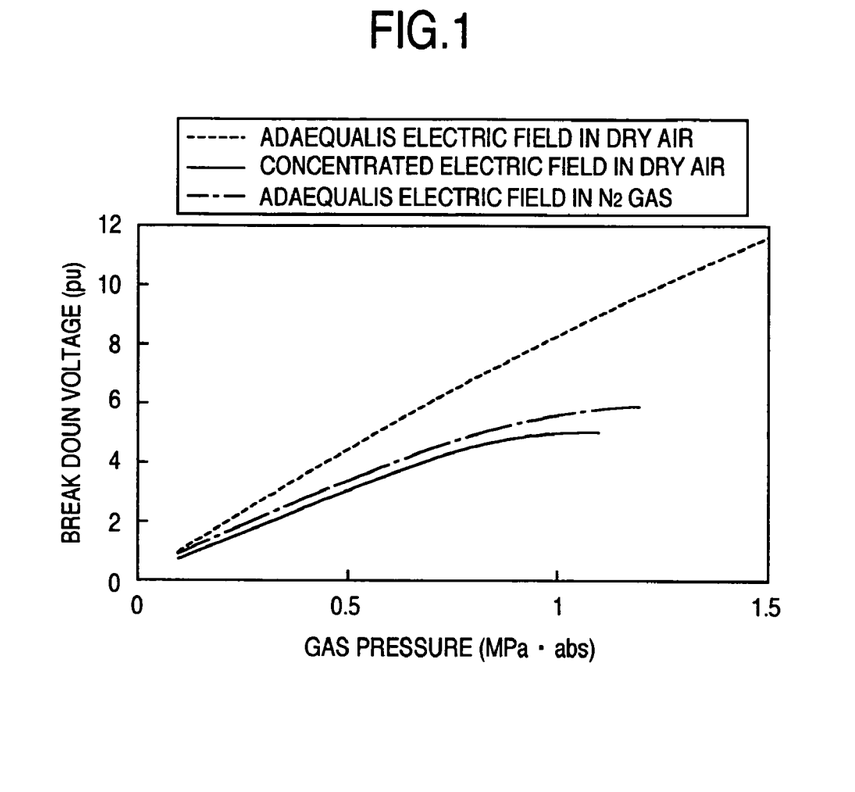
FIG. 1 is a diagram showing a relationship between a gas pressure and a break down voltage in each of an adaequalis electric field in dry air, a concentrated electric field in dry air and an adaequalis electric field in $N_2$ gas.

In FIG. 1, a gaseous pressure characteristic of break down voltage of each of pure $N_2$ and $N_2/O_2$ mixture gas (dry air) is shown. As described in "$SF_6$ no chikyuh-kankyou-huka to $SF_6$ kongou·daitai-gas zetuenn" of no. 841 Denki-gakkai-gijutsu-houkoku, a gaseous pressure characteristic of break down voltage in dry gas under adaequalis electric field is indicated by a dot line, and a gaseous pressure characteristic of break down voltage in $N_2$ under adaequalis electric field is indicated by a dashed line. The dielectric strength of $N_2$ saturates in a high gaseous pressure region not less than 0.8–1 Mpa·abs. A reason of this is that since $N_2$ has a gradual ionization characteristic change in the vicinity of critical electric field under the gaseous pressure less than about 0.5 Mpa·abs, a local electric field dependence is small so that the gaseous pressure effect determines the dielectric strength. On the contrary, since the electron avalanche is magnified by ionization in short length and the electric field destroying the insulation is high, the dielectric strength is strongly affected by weak point breakdown.

On the other hand, the gaseous pressure at which the dielectric strength of the air saturates is higher than the gaseous pressure at which the dielectric strength of $N_2$ saturates, and about 3 Mpa·abs. A reason of this is that by mixing with $O_2$, the local electric field dependence is lowered. But, the gaseous pressure characteristic of break down voltage in the air obtainable when the electric field is not constant or a high voltage electrode on which the electric field is concentrated locally is used, is not known.

The solid line in the drawing shows the gaseous pressure characteristic of break down voltage obtainable when the electric field is concentrated. When the electric field is concentrated, since the electric field locally becomes significantly high under the gaseous pressure of about 0.5 Mpa·abs, the dielectric field is strongly affected by the weak point breakdown and a dielectric strength saturation tendency is found from about 0.5 Mpa·abs. In the switchgear, it is difficult that the whole of high-voltage regions is designed as the adaequalis electric field, and is should be designed to have the gaseous pressure characteristic on which the electric field concentration is taken into consideration.

In a case of the dry air, while the break down voltage is increased by the effect of $O_2$ as the negative gas in comparison with $N_2$, the gaseous pressure characteristic depends on the characteristic of $N_2$ included by the whole gas by 80%, and has a tendency of saturating at 0.8–1 Mpa·abs. Therefore, when miniaturizing with increasing the gaseous pressure, the maximum gaseous pressure becomes about 1 Mpa·abs.

Figure 2:
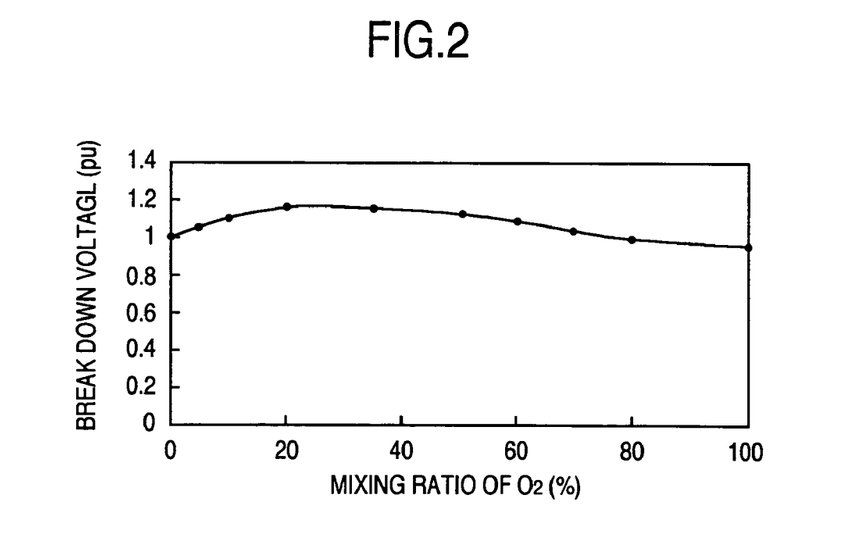
FIG. 2 is a diagram showing a relationship between a break down voltage and a mixing (content) ratio of $O_2$.
Figure 3:
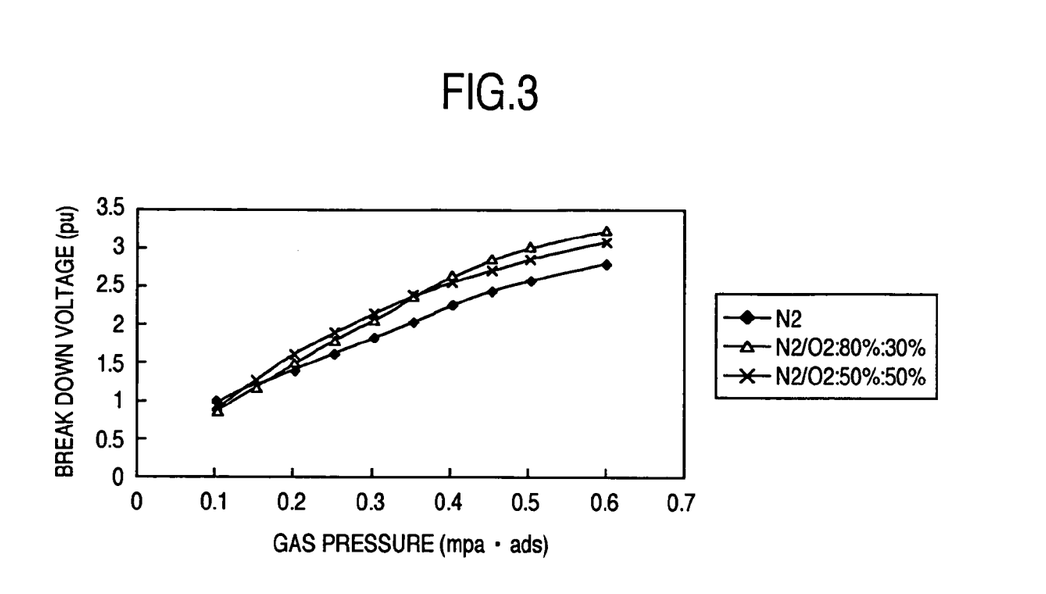
FIG. 3 is a diagram showing a relationship between a gas pressure and a break down voltage in each of mixing ratios between $N_2$ and $O_2$.

In FIG. 2, a relationship between a mixing rate and the break down voltage is shown. An ordinate corresponds to a relative ratio with respect to the break down voltage of $N_2$ gas. The mixing rate is an average of the break down voltage under a constant gaseous pressure. Generally speaking, an increase of the break down voltage caused by mixing $O_2$ with $N_2$ occurs within a range of the partial pressure 5–60% corresponding to the mixing rate of $O_2$. An optimum mixing rate of $O_2$ depends on the gaseous pressure. As shown in FIG. 3, the optimum mixing rate is the partial pressure rate of $O_2$ of 5–60% when the gaseous pressure is 0.2–0.4 Mpa·abs, and the optimum mixing rate is the partial pressure rate of $O_2$ of about 20% when the gaseous pressure is not less than 0.4 Mpa·abs. Therefore, the dry air can be deemed to be the mixture gas of $N_2$ and $O_2$ as the electron retarding gas, and the optimum gaseous pressure is not less than 0.4 Mpa·abs when the dry air is used.

On the other hand, a length of a bellows becomes great to deteriorate the miniaturization and weight saving when the gaseous pressure in a container receiving therein a vacuum switchgear becomes high. An operating life against repeated opening and closing operations of the bellows is evaluated from a stress applied to each of corners of the bellows, and the stress is calculated as a total amount of a stress caused by the pressure and a stress caused by a displacement. That is, the stress caused by the pressure increases in accordance with an increase of the gaseous pressure, but the stress applied to each of the corners can be decreased to not more than an acceptable level by increasing a number of the corners of the bellows.

Therefore, the length of the bellows is mainly determined on the basis of the stress caused by the displacement when the gaseous pressure is low, so that an increasing rate of the length of the bellows with respect to an increase of the gaseous pressure is small, and the length of the bellows is mainly determined on the basis of the stress caused by the pressure when the gaseous pressure is high, so that the length increases substantially in proportion to the gaseous pressure. Generally, when the gaseous pressure is not more than 0.2 Mpa·abs, the stress caused by the displacement is dominant, and when the gaseous pressure is not less than 0.5 Mpa·abs, the stress caused by the pressure is dominant.

Therefore, for miniaturization of the apparatus, a design flexibility needs to be maintained in a longitudinal direction of the bellows of the vacuum switch gear and so forth, and the miniaturization is obtainable by making a longitudinal direction of a container containing therein the vacuum switch gear and a longitudinal direction of the vacuum switchgear parallel to each other. Incidentally, since it is effective for minimizing an increase in volume of the switchgear that the length is increased in the longitudinal direction rather than a short length direction, it is effective for the miniaturization that the increase in length of the bellows in accordance with the increase of the gaseous pressure is absorbed in the longitudinal direction of the switchgear by making the longitudinal directions of the vacuum switchgear and the container parallel to each other.

Further, in the disconnecting switch, a small current interrupting performance is needed. Since the interrupting performance of the $N_2/O_2$ mixture gas includes problems of thermal destruction as well as continued current, a distance between poles cannot be necessarily decreased in accordance with the increase of the gaseous pressure. Therefore, the length in a direction between the poles increases in accordance with the increase of the gaseous pressure, so that a movable contact moving direction and a longitudinal direction of the container as well as the vacuum switchgear needs to be made parallel to each other to decrease the size and weight of the apparatus.

A wall thickness t1 of the container of cylindrical shape containing the high pressure gas with hermetic sealing increases in accordance with the gaseous pressure as shown in formula (1).

$$t1 = P \times D/(2\sigma) \qquad (1)$$

In this case, σ: allowable stress in circumferential direction, P: gaseous pressure, D: inner diameter, t1: wall thickness of cylinder. On the other hand, a plate thickness t2 of a flange not cylindrical increases in proportion to a square root of the gaseous pressure as shown in formula (2).

$$t2 = 2d \times (Z \times C \times P/\sigma)^{0.5} \qquad (2)$$

In this case, d: fixing bolt pitch circle, Z: constant value determined in accordance with a shape of plate, C: constant value determined in accordance with mounting feature of a flat plate, P: gaseous pressure, and σ: allowable stress. From the formulas (1) and (2), it is apparent that the weight of the apparatus increases in accordance with an increase of the plate thickness caused by the increase of the gaseous pressure. That is, the weight of the apparatus increases in accordance with the increase of the pressure of the used gas when the inner diameter is kept constant. Further, the miniaturization of the apparatus is restrained by an increase of driving force of the actuator caused by the increase of the gaseous pressure. On the other hand, from the relationship between the gaseous pressure and the break down voltage shown in FIG. 1, the increase of the gaseous pressure causes the increase of the dielectric strength to enable the size of the apparatus to be decreased, so that the size and weight of the apparatus is decreased. Therefore, an optimum gaseous pressure for decreasing both of the size and weight exists.

The optimum gaseous pressure changes in accordance with a ratio in weight between the cylindrical portion and the flange, but, it is generally used for the miniaturization and cost down that a number of the flanges is made minimum, that is, a constant value. Further, a length of the cylindrical portion can be decreased by the increase of the dielectric strength with an affect onto the mechanical portion or the like, so that its rate is small and estimated at about one-third in comparison with the change of the inner diameter.

Figure 4:
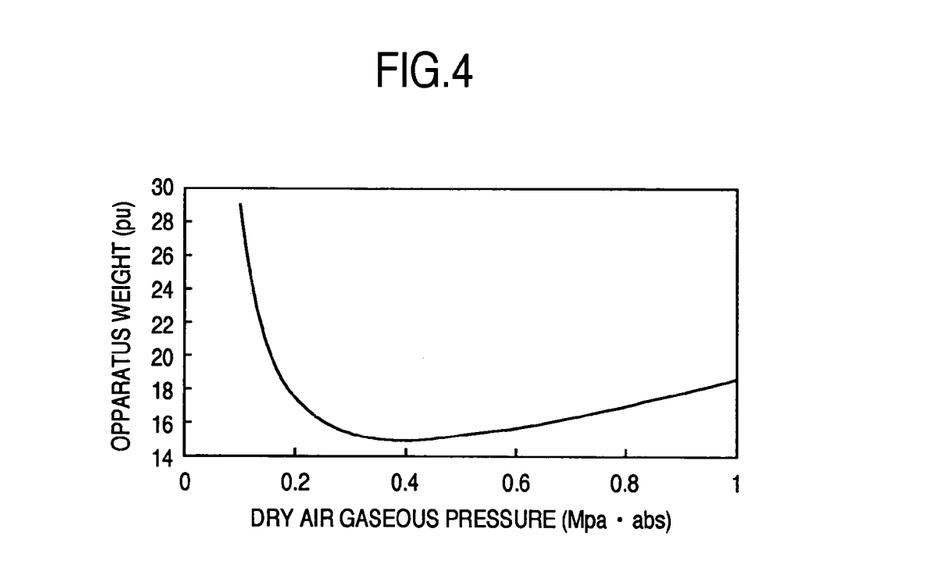
FIG. 4 is a diagram showing a relationship between a dry air gaseous pressure and an apparatus weight.

FIG. 4 shows an example in which a ratio in weight between the cylindrical portion and the flange is 4:1. The gaseous pressure for minimizing the weight of the apparatus is about 0.4 MPa·abs, and a design should be done to satisfy the gaseous pressure of 0.2–0.8 MPa·abs to obtain a design within a range of 20% from the minimum value. Further, when the gaseous pressure of the $N_2/O_2$ mixture gas is not more than 0.2 MPa·abs, the weight increases abruptly. An optimum range of the gaseous pressure of the dry gas for decreasing the size and weight of the switchgear is between 0.2–0.8 MPa·abs.

That is, in the gas-insulated switchgear tank including the insulating gas of the mixture gas (a partial pressure ratio of $O_2$ is 5%–60%) or dry air with the main components of $N_2$ and $O_2$, it is necessary for decreasing the size and weight that the minimum gaseous pressure or rated pressure is 0.2–0.8 MPa·abs.

Figure 5:
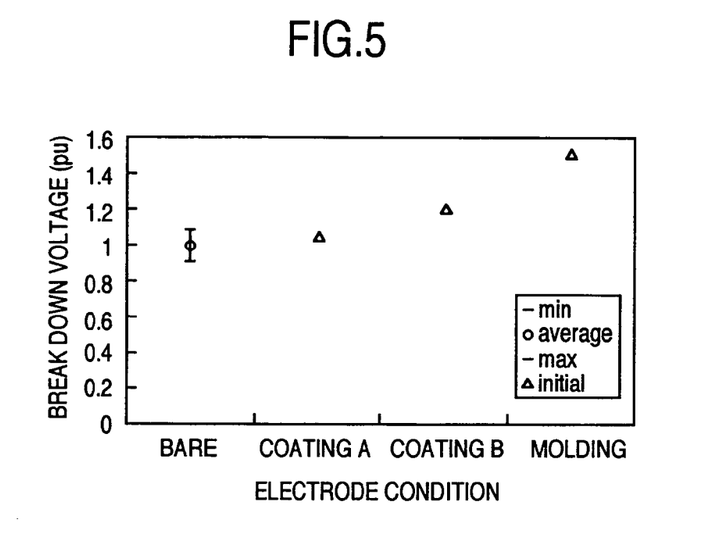
FIG. 5 is a diagram showing a relationship between a break down voltage and an electrode condition.

FIG. 5 shows the break down voltage changing in accordance with a treatment condition of the electrode in the $N_2/O_2$ mixture gas. Lowest and highest break down voltages of a bare electrode are indicated by bars, and an average break down voltage is indicated by O. By coating the electrode, an initial break down voltage is made not less than the average of the bare condition. Further, the insulating matter is molded on the electrode, the break down voltage is further increased, so that under the constant gaseous pressure, the initial break down voltage is made 1.5 times of the average of the bare condition, and the significant miniaturization is obtainable if using the mixture gas. Further, the gaseous pressure characteristic for the electrode with the insulating coat is in proportion to the gaseous pressure characteristic for the bare electrode, so that decreasing the weight and size is obtainable by incorporating the insulating coat or insulating molding under the constant optimum gaseous pressure.

As the insulating coat, epoxy type resin, polyethylene resin or the like is usable. Further, if the epoxy type insulating material including alumina, silica, titanium oxide or the like is used as the molding material, a specific inductive capacity can be adjusted somewhat freely in combination with the molded thickness to optimize the apparatus. Hereafter, a plurality of embodiments will be described.

[Embodiment 1]

Figure 6:
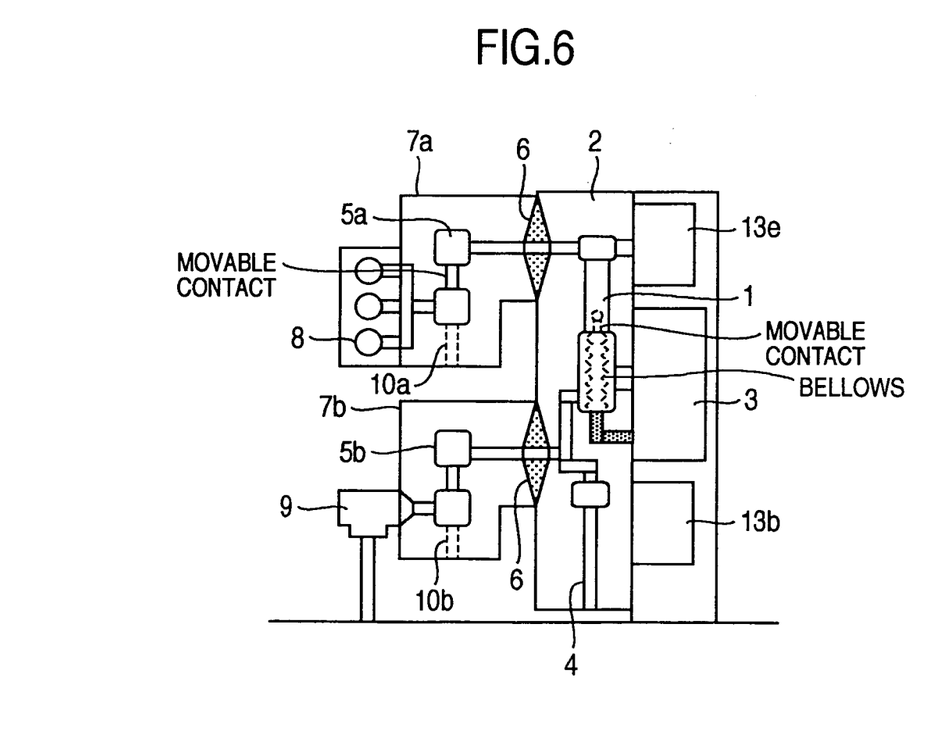
FIG. 6 is a schematic view showing a tank type gas insulated switchgear as an embodiment of the invention.

FIG. 6 shows an embodiment of a tank type gas insulated switchgear of the invention. Cylindrical pressure vessels 2, 7a and 7b are filled with a $N_2/O_2$ mixture gas or dry air of 0.2–0.8 MPa·abs. A vacuum circuit breaker 1 is contained in the cylindrical pressure vessel 2, a longitudinal direction of the cylindrical pressure vessel 2 is arranged parallel to a vertical direction, and a longitudinal direction of the vacuum circuit breaker 1 is arranged parallel to the longitudinal direction of the cylindrical pressure vessel 2. The vacuum circuit breaker 1 is connected to an operator 3 through an opening and closing operation rod below the vacuum circuit breaker 1. Further, an arrestor 4 is arranged under the vacuum circuit breaker 1 to decrease a size of the apparatus.

Arranging the longitudinal direction of the vacuum circuit breaker parallel to the vertical direction causes the following effects. When a length of a bellows increases in accordance with an increase of a gaseous pressure, a the bellows is bent to a V shape in response to the opening and closing operation occurs. Therefore, when the length of the bellows increases, a ring for preventing the bend needs to be arranged between protruding corners of the bellows is further increased. maximizing this bend occurs when the bellows extends perpendicularly to the vertical direction, but by arranging the bellows parallel to the vertical direction, a number of the rings for preventing the bellows bend can be decreased to decrease the length of the bellows and the size of the apparatus.

A bus bar disconnecting switch 5a and a line disconnecting switch 5b are connected to each other through a spacer 6 as a gas partition. A gas compartment containing the disconnecting switches 5 is gaseously separated from a gas compartment containing the vacuum circuit breaker 1, so that an influence to the other electric lines can be minimized by opening the disconnecting switches 5a and 5b when trouble with the vacuum circuit breaker 1 occurs or an inspection is needed. Further, movable contacts of the disconnecting switches 5 are formed monolithically respectively with movable contacts 10a and 10b of a grounding disconnecting switch to combine the disconnecting switches 5 and the grounding disconnecting switch with each other, so that a size of the disconnecting switches and grounding disconnecting switch is decreased. Further, a longitudinal direction of cylindrical pressure vessels 7a and 7b containing the disconnecting switches is arranged parallel to a movable direction of the movable contacts of the disconnecting switches 5. The longitudinal direction of the cylindrical pressure vessels 7a and 7b containing the disconnecting switches 5 is arranged parallel to the longitudinal direction of the cylindrical pressure vessel 2 containing the vacuum circuit breaker 1 to decrease the size and weight of the entire switchgear. Further, a solid insulation such as cable head 9 is applied to the bus bar 8 and lines to decrease the size of the apparatus and keep layout flexibility.

Further, the gaseous pressure in the cylindrical pressure vessel 2 containing the vacuum circuit breaker 1 is made lower than the gaseous pressure in the cylindrical pressure vessels 7 containing the disconnecting switches 5 to satisfy both the optimum miniaturization of the disconnecting switches 5 and the optimum miniaturization of the vacuum circuit breaker 1 and decrease the size of the whole apparatus. Additionally, since the electric field is concentrated at a high voltage shield of the disconnecting switches 5 and upper and lower electrodes and so forth of the vacuum circuit breaker 1, these areas to be insulated are coated by molding with the insulating coat of the epoxy type resin or the polyethylene resin including filler so that the significant miniaturization is obtainable without changing the gaseous pressure.

Further, by adding a sulfur type smelling agent to the mixture gas or dry air so that the mixture gas or dry air inserted into the apparatus becomes smelly, a gas leakage can be detected rapidly through the smell. The sulfur type smelling agent may be, for example, diethyl-disulfide, tasha-leaf or dimethyl-sulfide.

[Embodiment 2]

Figure 7:
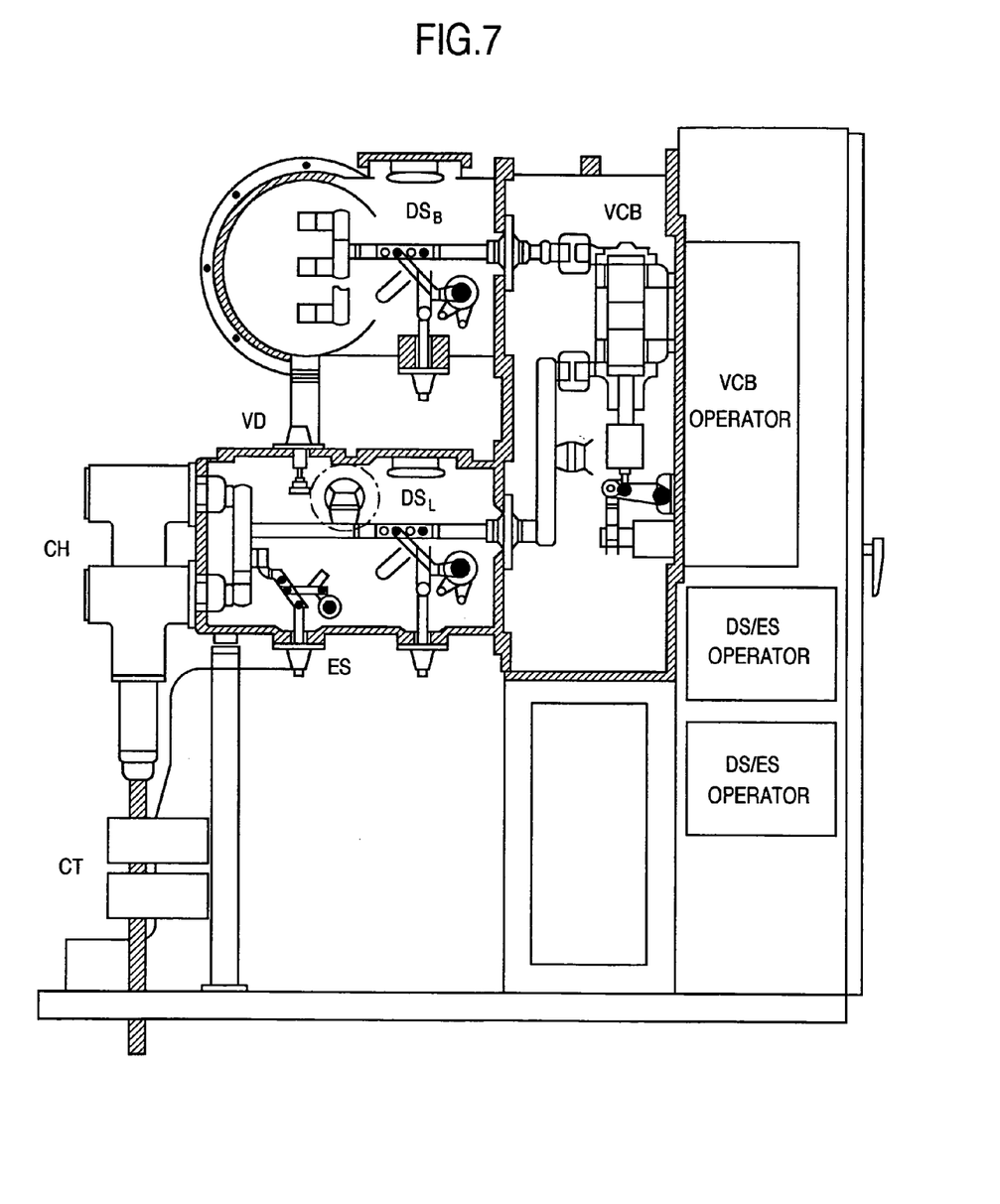
FIG. 7 is a schematic view showing another tank type gas insulated switchgear as another embodiment of the invention.

FIG. 7 shows another embodiment of a tank type gas insulated switchgear of the invention. The vacuum circuit breaker (VCB) is vertically arranged, and is connected to the disconnecting switch (DS) unit through the gas partition. The line side is connected to a power cable through a cable head, and a current therethrough is measured by a current transformer.

An operator of the VCB is arranged in a box at a right side of the drawing, and operators of the disconnecting switch (DS) and the earthed switch (ES) are arranged under the operator of the VCB. Each of the metallic vessels containing respectively the VCB, DS, ES and bus bar has a substantially cylindrical shape suitable for inner pressure. The vessels contain, for example, the dry air with the minimum pressure of 0.5 Mpa·abs to form a compact and light-weight gas insulated switch (GIS) including no global warming gas.

In this embodiment, the VCB and the line disconnecting switch ($DS_L$) are contained in a common gas compartment, and the insulating compartment for the bus bar disconnecting switch ($DS_B$) is gaseously isolated from the common gas compartment. In such structure, each line is great, and 2–4 gas compartments are arranged. The disconnecting switch DS is of blade type, and a fulcrum of the movable contact is arranged on the conductive member at the disconnecting switch side, to include the earthed switch ES.

Further if dry air is used as the insulating gas, rarely occurring leakage thereof from the apparatus will not affect the environment, but it is difficult for a gas leaking position to be found, so that in the worst case, all of the gas compartments need to be replaced. Therefore, if helium or $CF_3CH_2F$ of partial pressure ratio of not more than 5% is mixed with the dry air, the gas leaking position can be found easily by use of a gas detector so that a recovery can be performed effectively.

[Embodiment 3]

Figure 8:
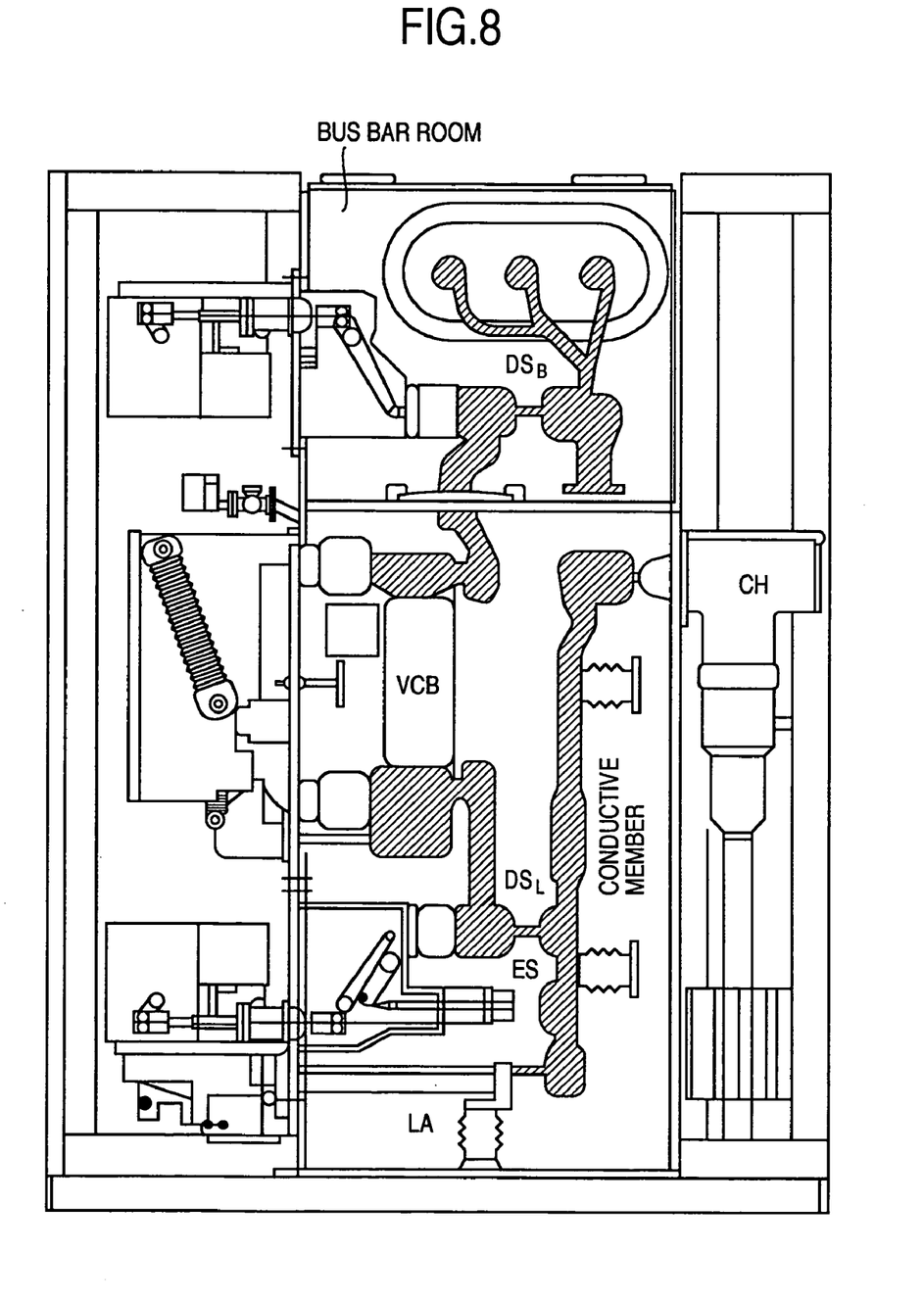
FIG. 8 is a schematic view showing a box type C gas insulated switchgear as another embodiment of the invention.

FIG. 8 shows an embodiment of a box type C-gas insulated switch (GIS) of the invention. When the box type vessel is used, a weight increase in accordance with the increase of the gaseous pressure is remarkable in comparison with the cylindrical vessel, and the optimum gaseous pressure is relatively lower in comparison with the cylindrical vessel, so that a range of the minimum or rated gaseous pressure optimum for decreasing the size and weight is between 0.2–0.7 Mpa·abs. When the vessel is of box shape, an effect for decreasing an amount of the used gas is lower in comparison with the cylindrical vessel, but an space efficiency for mounting the switchgear can be improved.

In this embodiment, the VCB and the line disconnecting switch ($DS_L$) are contained in a common gas compartment, and the insulating compartment for the bus bar disconnecting switch ($DS_B$) is gaseously isolated from the common gas compartment. In such structure, each line is great, and 2–4 gas compartments are arranged. A linear type is applied to the disconnecting switch DS, and the disconnecting switch $DS_L$ on the circuit breaker side and the earthed switch ES are arrange perpendicularly to the vertical direction, so that a height of the switch gear is decreased. Further, it is connected to an underearth power cable through a cable head CH. Bus bars as gas-insulated bus bars are arranged parallel to each other to form three phase combined type, and the mixture gas (including the dry air) is applied to the circuit breaker compartment and the bus bar disconnecting switch with the minimum kept gaseous pressure not less than 0.2 Mpa·abs and not more than 0.7 Mpa·abs, so that both the environment-accordance and the dielectric strength are obtainable.

In C-GIS, the box shape causes the increase of the vessel size and cost in accordance with the increase of the rated gaseous pressure, and thereby the gaseous pressure is preferably as low as possible. Therefore, if the dry gas is used as the insulating gas for example, the minimum kept gaseous pressure or rated gaseous pressure is made 0.3–0.5 Mpa·abs, and the insulating coat or molding is used. In this case, the apparatus can have the same or less size in comparison with the apparatus with $SF_6$ gas of the minimum kept gaseous pressure (0.17 Mpa·abs).

[Embodiment 4] Gas

Figure 9:
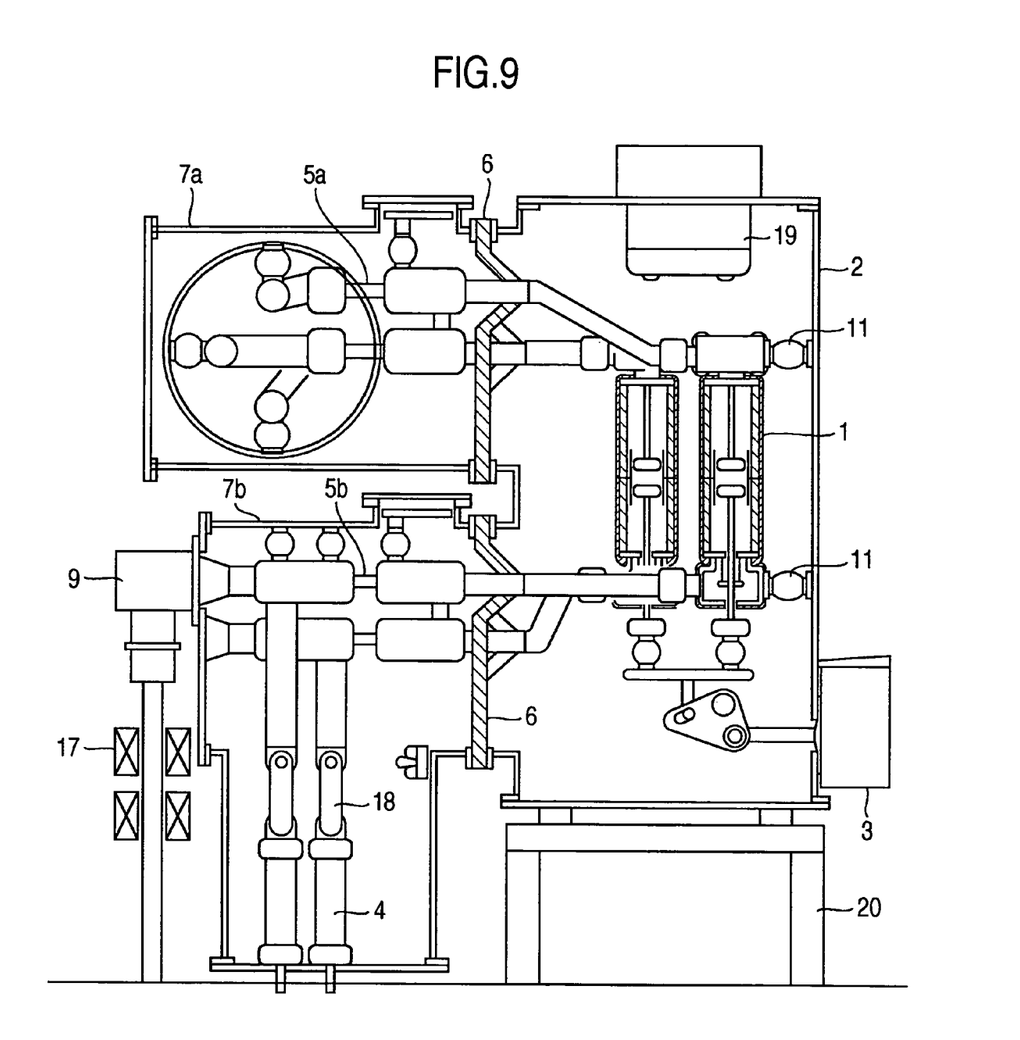
FIG. 9 is a schematic view showing a three-phase gas insulated switchgear as another embodiment of the invention.

FIG. 9 shows an embodiment of a GIS of three phase combined of the invention. The vacuum circuit breaker 1 is arranged vertically, and connected to the bus bar disconnecting switch 5a and the line disconnecting switch 5b. It is connected through the cable head 9 to the power cable, the breaker 1 is contained in the metallic vessel 2, the disconnecting switch 5a and the bus bar are contained in the metallic vessel 7a, and the disconnecting switch 5b is contained in the metallic vessel 7b, so that the size is decreased. The mixture gas of $N_2$ and $O_2$ or the dry air is used and the rated gaseous pressure is not less than 0.2 Mpa·abs and not more than 0.8 Mpa·abs, so that the environment-accordance and the decrease of the weight and size are achieved in the GIS. Incidentally, 19 denotes an absorbing agent container, and 20 denotes a mounting table.

The vacuum circuit breakers 1 are arranged parallel to the vertical direction and form a triangle shape, so that an inner diameter of the cylindrical pressure vessel 2 containing the vacuum circuit breakers 1 is decreased. The vacuum circuit breakers 1 are connected to the operator 3 through the operating rods under the vacuum circuit breakers 1, so that the vacuum circuit breakers 1 are operated to be opened and closed by converting horizontal movement of the operator 3 to vertical movement. Further, the arrestor 4 as well as an arrestor release device 18 are arranged under the line disconnecting switch 5b connected to the cable head 9 so that the miniaturization is obtained and an efficiency of test with electrically energizing on setting the apparatus is significantly improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A gas-insulated switchgear tank in which an electric insulating characteristic is improved by a gas, comprising a vacuum circuit-breaker, a disconnecting switch, and a container in which the vacuum circuit-breaker and the disconnecting switch are arranged and an inside of which container is hermetically sealable and filled with the gas such that the vacuum circuit-breaker and the disconnecting switch are at least partially surrounded by the gas,
   wherein the gas includes $N_2$ and $O_2$, the container includes a first compartment in which at least a part of the vacuum circuit-breaker is exposed to the gas, and a second compartment gaseously isolated from the first compartment and in which at least a part of the disconnecting switch is exposed to the gas and a gaseous pressure in the first compartment is lower than a gaseous pressure in the second compartment, and
   the vacuum circuit-breaker has a vacuum chamber and a deformable bellows configured to expand and to contract a contact movable in the vacuum chamber, and an outer periphery of the vacuum chamber arranged to be exposed to the gas in the first compartment.

2. The gas-insulated switchgear tank according to claim 1, wherein the gas excludes a vapor whose dew point which has a value not less than a minimum value of an environment temperature in which the gas-insulated switchgear tank is used.

3. A gas-insulated switchgear tank according to claim 1, wherein the gas includes $N_2$ and $O_2$ and excludes a vapor whose dew point has a value not less than a minimum value of a container temperature at which at least one of the vacuum circuit-breaker and the disconnecting switch is operated.

4. The gas-insulated switchgear tank according to claim 1, wherein the gas further includes a smelly gas component.

5. The gas-insulated switchgear tank according to claim 1, wherein a partial pressure of $O_2$ is 5–60% of a total pressure of the gas.

6. The gas-insulated switchgear tank according to claim 1, wherein a direction in which a movable contact of at least one of the vacuum circuit-breaker and the disconnecting switch is movable is vertical.

7. The gas-insulated switchgear tank according to claim 1, wherein a pressure of the gas in the container is 0.2–0.8 MPa·abs.

8. The gas-insulated switchgear tank according to claim 1, wherein the gas includes $N_2$ and $O_2$ as main components thereof.

9. The gas-insulated switchgear tank according to claim 1, wherein a maximum length of a part of the gas-insulated switchgear tank which part is prevented from including a driving mechanical force generator for generating a driving mechanical force used in the gas-insulated switchgear tank extends along a direction along which a maximum length of the vacuum circuit-breaker extends.

10. The gas-insulated switchgear tank according to claim 9, wherein the direction is vertical.

11. The gas-insulated switchgear tank according to claim 1, wherein a maximum length of a part of the gas-insulated switchgear tank which part is prevented from including a driving mechanical force generator for generating a driving mechanical force used in the gas-insulated switchgear tank extends along a direction in which a movable contact of at least one of the vacuum circuit-breaker and the disconnecting switch is movable.

12. The gas-insulated switchgear tank according to claim 11, wherein the direction is vertical.

13. The gas-insulated switchgear tank according to claim 1, wherein the container has one of cylindrical shape and box shape.

14. The gas-insulated switchgear tank, according to claim 1,
   wherein both ends of the vacuum chamber terminating respectively in an expansion and contraction direction overlap each other at least partially as seen vertically.

15. The gas-insulated switchgear tank according to claim 1, wherein a ratio of a partial pressure of $O_2$ in the gas to a total pressure of the gas is greater than a ratio of a partial pressure of $O_2$ in the atmosphere to a total pressure of the atmosphere.

* * * * *